Patented Sept. 16, 1930

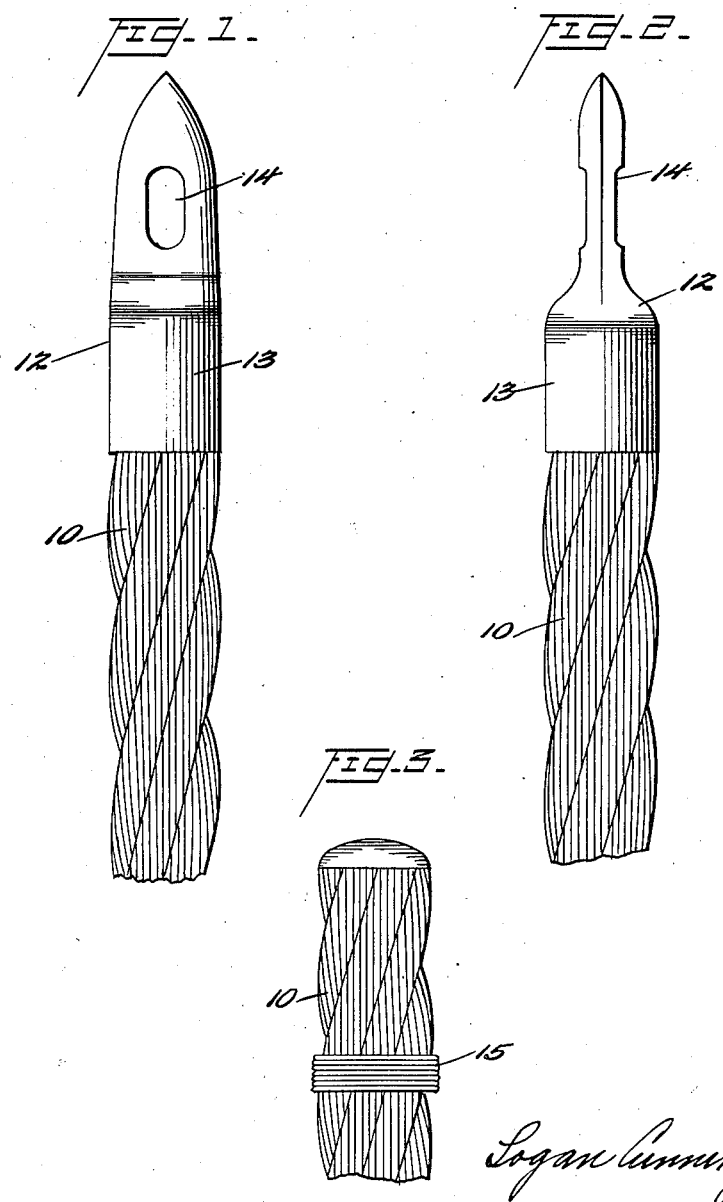

1,775,954

UNITED STATES PATENT OFFICE

LOGAN CUNNINGHAM, OF SOUTH WILLIAMSPORT, PENNSYLVANIA

CABLE END AND METHOD OF FORMING THE SAME

Application filed August 14, 1929. Serial No. 385,781.

This invention relates to a method of treating the ends of cables such as are made up of a multiplicity or bundle of individual metallic strands, twisted or otherwise wrapped together, and more specifically to a means and method for facilitating the threading of such cables through sheaves, drums or tools.

It has heretofore been proposed to taper and solder the ends of cables or wire ropes to prevent the strands of the cable from spreading so that the cable may be freely passed through a sheave or similar member. This method of treating a cable is a mere temporary expedient and is furthermore open to the objection that the process involves increasing the diameter of the cable. For instance, it is customary to use seizing wire to retain the strands in proper position, and this wire must be retained on the cable to prevent spreading of the strands during the operation of threading the cable through a small opening. It will be appreciated that any process for treating cable ends involving an increase in the diameter of the cable renders it difficult to thread the cable through a small sheave and fails to offer a satisfactory solution of the problem involved.

In order to overcome this objection to the conventional method of binding the end strands of a cable, the present invention contemplates the provision of an element for attachment to the end of a stranded cable, this element having a diameter no greater than the diameter of the cable and preferably so formed as to be substantially coextensive with the cable so that no obstruction is offered to the insertion of the cable end through a sheave or drum. The invention further contemplates the formation of a portion of this element in such a manner that a smaller rope may be readily secured thereto for the purpose of pulling the cable through the sheave.

It is a further object of the invention to provide a method of fusing an element to a cable end in such a manner that the cable and element will constitute a substantially homogeneous unit of uniform diameter.

A more specific object of the invention is the provision of an eye for a cable end, the eye being so secured to the cable as to constitute substantially an integral part thereof, and the provision of a novel method of uniting an eye to a cable.

Further features and objects of the invention will be apparent from the following description thereof taken in connection with the accompanying drawings in which:

Figure 1 is a plan view of a cable having an element secured thereto in accordance with the principles of the present invention;

Figure 2 is a side elevation of Fig. 1; and,

Figure 3 illustrates a step in the preferred process involving preliminary treatment of the cable end prior to uniting the element to the cable.

The present invention may be applied to stranded cables of various types, and is applicable to a cable formed entirely of metal as well as the equally conventional form of cable consisting of a fibrous core covered with twisted strands. In Figure 1 of the drawing, a conventional stranded metallic cable is indicated at 10, an element 12 being united to one end of the cable. It will be noted that this element consists of a substantially cylindrical shank 13 having a diameter equal to that of the cable, and an integrally formed eye 14. For convenience in describing the invention the element 12 will be hereafter referred to as an eye, but it will be readily appreciated that the invention is not limited as regards the specific construction of this element. For instance, the portion 14 of the element might be formed as a hook or a clamp or in any other manner which will permit the ready attachment of a rope to the element. The eye may be secured to the cable end by any conventional process of electric or acetylene welding, but I prefer to butt-weld these parts with an oxy-acetylene torch, and to carry out this method in the manner hereinafter specifically described.

The ends of the wire rope are preferably served by wrapping a soft black iron wire 15 around the cable so as to leave about one and one-half inches to three inches of the cable protruding through the service, the length of protruding cable depending on the diameter of the cable being treated. The cable is then preferably cut in such a manner that the ends of the individual strands lie in a single plane, and it is found that the cutting of the cable may be most conveniently effected by an oxy-acetylene cutting torch which leaves the end in its normal size and shape and prevents the formation of any bulge or distortion.

The cutting torch is first adjusted in the manner ordinarily employed for the cutting of steel plate, with the exception that a slightly reducing preheating flame is used. The cable end is first warmed by the torch to remove any grease, care being taken to prevent the service from becoming unduly heated during this and subsequent operations. After the grease is removed, preheating flames are applied to the extreme end of the cable and the actual cutting operation is then started. Inasmuch as the cable consists of a series of wrapped wires, the cutting operation is not as rapid as in the cutting of solid metal, and it is necessary to play the cutting torch flame back and forth across the cable so that the stranded ends are partially welded and cut simultaneously. When the cable is cut in this manner, sufficient heat is radiated into each strand so that the individual strands are partially welded and thus form a substantially homogeneous mass to facilitate the cutting operation. When the cable is completely cut, the end is preferably immersed in water in order to partially clean the same and to prepare the slag produced during the cutting operation so that it may be readily removed.

In the event that the process is applied to a cable having a large hemp or manilla core the cutting is considerably retarded, and it is difficult to obtain clean cut ends suitable for welding. In such a case it is found advisable to cut first one side of the cable and then the other side until the entire surplus metal has been removed. A few moments exposure of the remaining core to the cutting flame will leave the end clean and preserve the core. In the case of exceptionally heavy core cables, both the cutting and welding should proceed as rapidly as conditions will permit.

The slag and scale produced by the cutting are now carefully removed in any conventional manner, the cable end is placed in a vise, and the welding operation is started by the fusion of a mild steel welding rod to the cable adjacent the end thereof to form a band about the cable. A 1/8" mild steel copper coated welding rod has been found particularly suitable for general use in this operation, the welding of high carbon steel cable being conveniently effected by the use of a welding rod of approximately 3½% nickel steel. A minimum amount of metal is deposited on the cable, the amount being sufficient merely to keep the cable from burning, the band being maintained within the outside diameter of the cable.

After all the strands have been completely banded together by this operation, the welding of the ends of the strands is effected, this welding proceeding from the outer edge of the cable toward the center. In the event that a manilla or other non-metallic core is provided within the cable, the operation of welding the strand ends will result in burning this core to some extent, and if desired, the space thus formed in the cable may be filled with metal from the welding rod, the cable being preferably built up in the center so that the cable end presents a convex surface. When this step in the welding operation is completed, the cable end will have the general appearance indicated in Fig. 3 of the drawing.

The eye or other element which is to be united to the cable is then brought to a welding temperature and is tack welded to the cable end, the welding operation being completed in the conventional manner and the cable and eye being subsequently forged to obtain a smooth, round joint having a diameter substantially equal to the diameter of the cable. The article is then cooled by successive immersions in liquid, raw linseed oil being found most suitable for this purpose. The service is now removed and the cable and eye are ready for use.

It will be understood that the method outlined above for securing the eye to the cable is one which has been found entirely suitable and practical and is set forth in detail for the purpose of completely disclosing the invention. It is obvious, however, that other methods may be utilized for this purpose, and that the invention is not limited to the precise method or article defined herein but is subject to various alterations and modifications such as may fall within the spirit and scope of the appended claims.

Having thus described the invention what is claimed as new and desired to be secured by Letters Patent is:

1. The combination with a stranded metallic cable, of means fused to one end of the cable to form an integral part thereof, said means being of substantially the same diameter as the cable adjacent the point of fusion and having a portion thereof formed to receive a rope to facilitate threading the cable through a sheave.

2. The combination with a stranded metallic cable, of an element fused to one end of said cable to form an integral unit therewith, said element having a substantially cylindrical solid shank portion united to the cable end, and an eye portion for receiving a rope to facilitate threading the cable through a sheave, said shank portion being of such diameter that the external surfaces of the cable and shank are coextensive in the finished article.

3. The method of uniting an eye with the end of a stranded metallic cable to facilitate insertion of the cable in a sheave which comprises serving the cable adjacent one end thereof to temporarily retain the strands in normal relative position, welding additional metal on the strand ends to unite the latter, and butt-welding the eye to the prepared cable end.

4. The method of uniting the end of a stranded metallic cable to a substantially cylindrical element having a diameter no greater than the diameter of the cable which comprises temporarily holding the cable strands in their proper relative position, severing the cable end with a cutting flame so that the strand ends are disposed in a single plane, applying metal to the cable adjacent the end and across the strand ends by welding, and butt-welding the element to the prepared cable end.

In testimony whereof I hereunto affix my signature.

LOGAN CUNNINGHAM.